United States Patent
Chen

(10) Patent No.: US 8,478,975 B2
(45) Date of Patent: Jul. 2, 2013

(54) ELECTRONIC DEVICE AND METHOD FOR DETECTING OPERATIVE STATES OF COMPONENTS IN THE ELECTRONIC DEVICE

(75) Inventor: Shao-En Chen, Tu-Cheng (TW)

(73) Assignee: Chi Mei Communications Systems, Inc., New Taipei (TW)

( * ) Notice: Subject to any disclaimer, the term of this patent is extended or adjusted under 35 U.S.C. 154(b) by 488 days.

(21) Appl. No.: 12/825,350

(22) Filed: Jun. 29, 2010

(65) Prior Publication Data

US 2011/0185161 A1   Jul. 28, 2011

(30) Foreign Application Priority Data

Jan. 26, 2010 (TW) .............................. 99102064 A

(51) Int. Cl.
*G06F 9/00* (2006.01)
(52) U.S. Cl.
USPC .................................................. 713/1; 713/2
(58) Field of Classification Search
USPC ....................................................... 713/1, 2
See application file for complete search history.

(56) References Cited

U.S. PATENT DOCUMENTS

| 6,792,526 B1 * | 9/2004 | Klein et al. ................. 713/1 |
| 7,721,153 B2 * | 5/2010 | Nash et al. ................. 714/36 |
| 2005/0246582 A1 * | 11/2005 | Nash et al. ................. 714/12 |
| 2007/0006212 A1 * | 1/2007 | Kawamoto ................. 717/170 |

FOREIGN PATENT DOCUMENTS

| CN | 101324855 A | 12/2008 |
| JP | 2002082926 A * | 3/2002 |

* cited by examiner

*Primary Examiner* — Chun Cao
(74) *Attorney, Agent, or Firm* — Altis Law Group, Inc.

(57) ABSTRACT

An electronic device and method for detecting operative states of components in the electronic device includes determining a selected component of the electronic device, and setting a threshold time of the selected component. In response to the electronic device detecting a first interrupt instruction from the selected component, a timer of the electronic device is enabled to time the threshold time. Upon the condition that the threshold time elapses, the selected component is determined to be in an abnormal state. Then the selected component is restarted and initialized.

15 Claims, 2 Drawing Sheets

ELECTRONIC DEVICE AND METHOD FOR DETECTING OPERATIVE STATES OF COMPONENTS IN THE ELECTRONIC DEVICE

BACKGROUND

1. Technical Field

Embodiments of the present disclosure relate to management technology, and more particularly to an electronic device and method for detecting operative states of components in the electronic device.

2. Description of Related Art

An electronic device may have more powerful functions if various different components are installed in the electronic device. For example, a camera module may be installed in the electronic device to capture images. However, if an error occurs with one of the installed components, the electronic device has to be restarted to resume functions of the installed component. It is inconvenient and makes inefficient use of the electronic device.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or Assembly. One or more software instructions in the modules may be embedded in firmware, such as an erasable programmable read only memory (EPROM). It will be appreciated that modules may comprised connected logic units, such as gates and flip-flops, and may comprise programmable units, such as programmable gate arrays or processors. The modules described herein may be implemented as either software and/or hardware modules and may be stored in any type of non-transitory computer-readable medium or other computer storage system.

Figure 1:
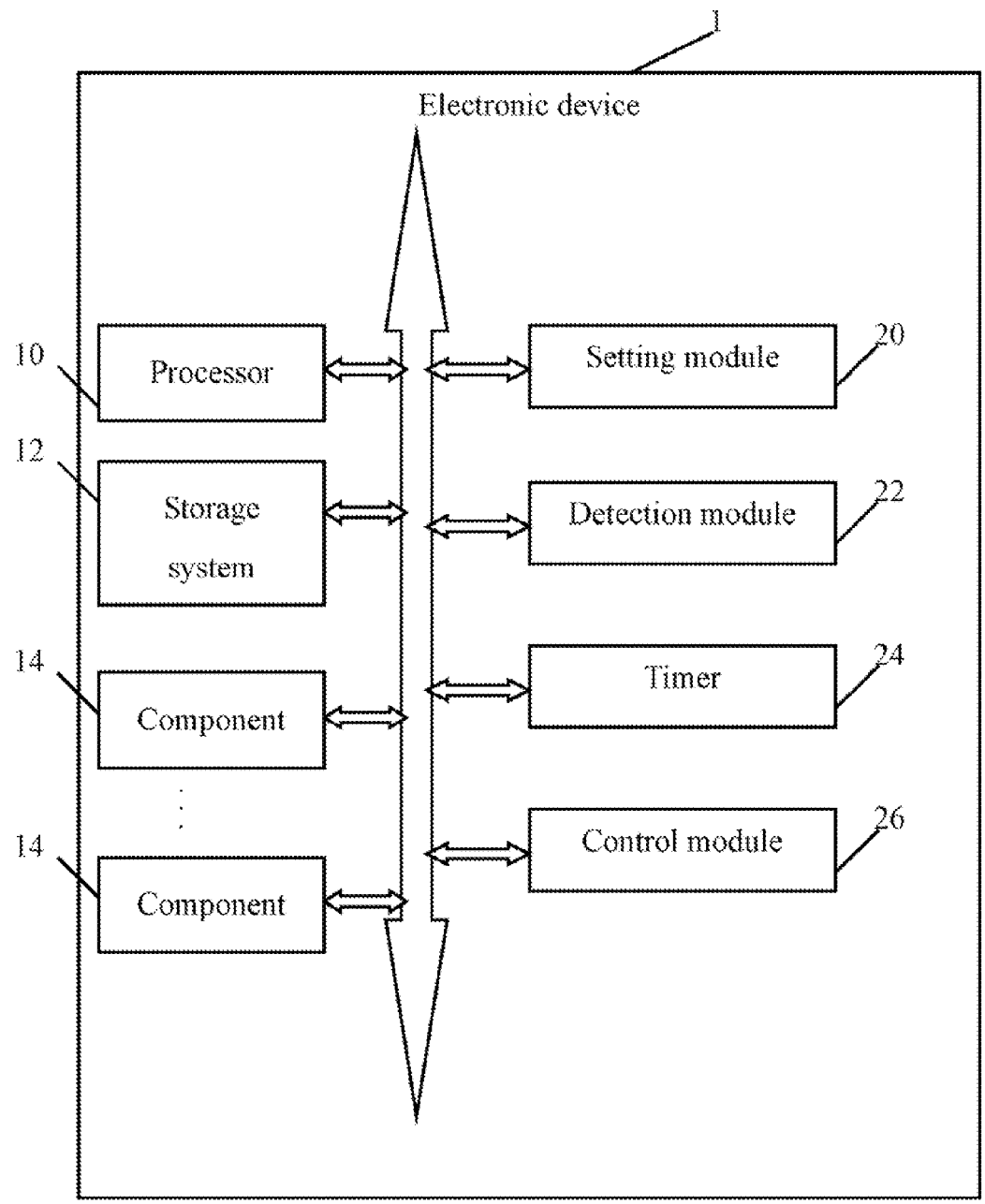
FIG. 1 is a block diagram of one embodiment of an electronic device.

FIG. 1 is a block diagram of one embodiment of an electronic device 1. The electronic device 1 includes a plurality of components 14, such as, a camera module, a touch panel, a keyboard, or a gravity sensor (G-sensor), for example. In some embodiments, the electronic device 1 may be used to detect operative states of the components 14, and to restart the components 14 if the components 14 are in abnormal states. In some embodiments, the operative states of the components 14 represents working statuses of the components 14. For example, the operative states may include a normal state and an abnormal state. If the components 14 cannot work normally, such as capture images, or output audible/visible data, the components 14 are determined to be in the abnormal state. Detail operations will be provided below.

The electronic device 1 may be a mobile phone, a personal digital assistant, a handheld computer, or any other kind of computing device. The electronic device 1 also includes a processor 10 and a storage system 12. The processor 10 executes one or more computerized operations of the electronic device 1 and other applications, to provide functions of the electronic device 1.

The storage system 12 stores one or more programs, such as programs of the operating system, other applications of the electronic device 1, and various kinds of data, such as images, E-mails, for example. In one embodiment, the electronic device 1 may be a mobile phone, and the storage system 12 may include a memory of the electronic device 1 and/or an external storage card, such as a memory stick, a smart media card, a compact flash card, or any other type of memory card.

In one embodiment, the electronic device 1 further includes a setting module 20, a detection module 22, a timer 24, and a control module 26. The modules 20, 22, 24 and 26 may comprise one or more computerized codes to be executed by the processor 10 to perform one or more operations of the electronic device 1. Details of these operations are provided below.

The setting module 20 determines one of the components 14 of the electronic device 1 as a selected component 14. Each of the components 14 have one or more standard/factory parameters to identify if each of the components 14 is operative in the normal state. The setting module 20 determines a standard interval of the selected component 14. The standard interval is one of the standard/factory parameters of the selected component 14. In some embodiments, the standard interval represents a time interval of the selected component 14 sends interrupt instructions to the processor 10.

For example, the selected component 14 sends interrupt instructions to the processor 10 at each standard interval upon the condition that the selected component 14 is operative in the normal state. The interrupt instructions may represent that the selected component 14 will send specific data to the processor 10. Detailed descriptions of the standard interval are provided below.

According to the standard interval, the setting module 20 further sets a threshold time of the selected component 14 to determine if the selected component 14 is in the normal state. In some embodiments, the threshold time is used to determine if the selected component 14 sends at least one interrupt instruction to the processor 10 during the threshold time. If the selected component 14 sends at least one interrupt instruction to the processor 10 during the threshold time, the selected component 14 is under the normal state. If the selected component 14 does not send any interrupt instruction to the processor 10 during the threshold time, the selected component 14 is under the abnormal state. The threshold time may be equal to or longer than the standard interval.

For example, it is assumed that the selected component 14 is a camera module. When the camera module is operative in the normal state (e.g., in a preview mode), a standard interval of the camera module represents a time interval between receipts of two consecutive images of the processor 10. Supposing a standard frame rate of the camera module under the preview mode is 15 frames per second (fps). As a result, a standard interval of the camera module is $1/15 \approx 0.066$ second, that is 66 ms. That is, the camera module sends an image to the processor 10 at each 66 ms.

In some embodiments, the threshold time of the camera module may be 100 ms. If the camera module sends the image to the processor 10 at more than 100 ms, the camera module is determined to be under the abnormal state.

The detection module 22 detects a first interrupt instruction from the selected component 14, and enables the timer 24 to start timing the threshold time. For example, the selected component 14 is the camera module. The camera module sends a vertical synchronization (VSYNC) interrupt instruction to the processor 10 upon the condition that the camera module is under the preview mode and in the normal state. In response to receiving the VSYNC interrupt instruction, the processor 10 determines that the camera module starts to send data (e.g., captured images) to the processor 10.

Upon the condition that the threshold time elapsing and the detection module 22 detecting no interrupt instructions from the selected component 14, the control module 26 determines that the selected component 14 is in the abnormal state. Then the control module 26 restarts the selected component 14 and initializes the selected component 14. In some embodiments, the control module 26 records settings of the selected component 14 before the selected component 14 is restarted, and restores the recorded settings of the selected component 14 after the selected component 14 is restarted.

For example, if the selected component 14 is the camera module, the settings may include, but are not limited to, a focus and/or a brightness of the camera module.

In response to the detection module 22 detecting a second interrupt instruction from the selected component 14 before the threshold time elapses, the control module 26 determines that the selected component 14 is in the normal state. At the same time, the detection module 22 resets the timer 24.

Figure 2:
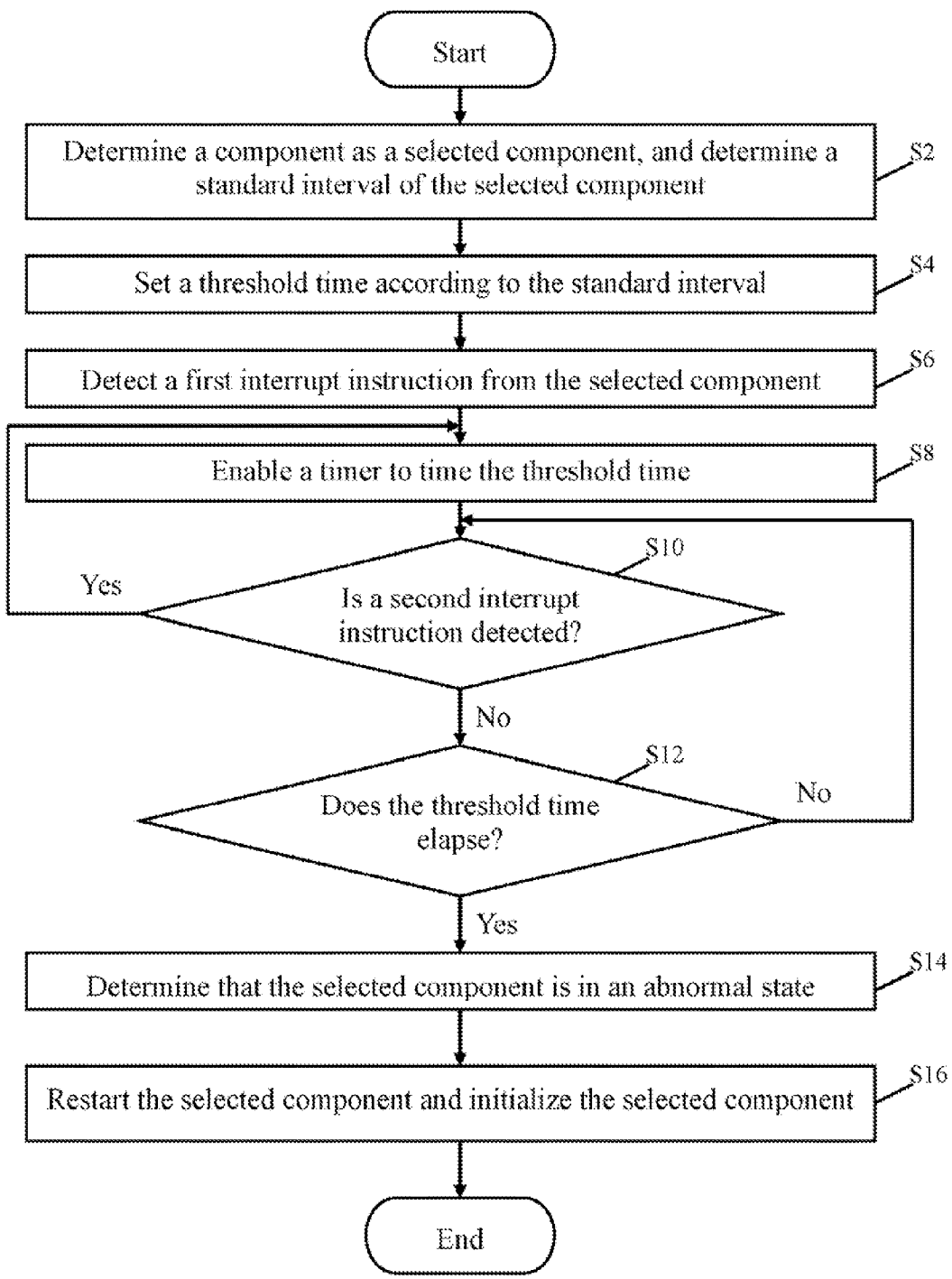
FIG. 2 is a flowchart of one embodiment of a method for detecting operative states of components in the electronic device of FIG. 1.

FIG. 2 is a flowchart of one embodiment of a method for detecting operative states of components in the electronic device 1 of FIG. 1. Depending on the embodiment, additional blocks may be added, others removed, and the ordering of the blocks may be replaced.

In block S2, the setting module 20 determines one of the components 14 of the electronic device 1 as a selected component 14. The setting module 20 also determines a standard interval of the selected component 14. As mentioned above, the selected component 14 sends interrupt instructions to the processor 10 at each standard interval upon the condition that the selected component 14 is operative in the normal state.

In block S4, according to the standard interval, the setting module 20 further sets a threshold time of the selected component 14 to determine if the selected component 14 is in the normal state. As mentioned above, the threshold time is longer than the standard interval.

In block S6, the detection module 22 detects a first interrupt instruction from the selected component 14. For example, the selected component 14 is the camera module. The camera module sends a vertical synchronization (VSYNC) interrupt instruction to the processor 10, in response to the camera module being under the preview mode.

In block S8, the detection module 22 enables the timer 24 to start timing the threshold time in response to the detection module 22 detecting the first interrupt instruction from the selected component 14.

In block S10, the detection module 22 determines if a second interrupt instruction is detected. If the detection module 22 detects the second interrupt instruction, the procedure returns to block S8, to reset the timer 24.

If the detection module 22 does not detect the second inst interrupt instruction, in block S12, the timer 24 determines if the threshold time elapses. If the threshold time does not elapse, the procedure returns to block S10.

If the threshold time elapses, in block S14, the control module 26 determines that the selected component 14 is in the abnormal state.

In block S16, the control module 26 restarts the selected component 14 and initializes the selected component 14. As mentioned above, the control module 26 records settings of the selected component 14 before the selected component 14 is restarted, and restores the recorded settings of the selected component 14 after the selected component 14 is restarted.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A method for detecting operative states of components in an electronic device, the electronic device comprising a processor, the method comprising:
   determining one of the components as a selected component;
   setting a threshold time of the selected component to determine whether the selected component is in a normal state;
   in response to detecting a first interrupt instruction from the selected component, enabling a timer of the electronic device to time the threshold time;
   determining that the selected component is in the normal state in response to detecting a second interrupt instruction before the threshold time elapses; or
   determining that the selected component is in an abnormal state upon the condition that the threshold time elapses, and restarting the selected component and initializing the selected component by recording settings of the selected component before the selected component is restarted, and restoring the recorded settings of the selected component after the selected component is restarted.

2. The method according to claim 1, further comprising:
   in response to detecting the second interrupt instruction from the selected component, resetting the timer.

3. The method according to claim 1, wherein the step of setting a threshold time of the selected component to determine whether the selected component is in a normal state comprises:
   determining a standard interval of the selected component, the selected component sending interrupt instructions to the processor of the electronic device at each standard interval upon the condition that the selected component is in the normal state; and
   setting the threshold time of the selected component to be equal to or longer than the standard interval.

4. The method according to claim 1, wherein the selected component is a camera module, and a standard interval of the camera module represents a time interval between receipts of two consecutive images of the processor when the camera module is in a preview mode.

5. The method according to claim 1, wherein the electronic device is a mobile phone, a personal digital assistant, or a handheld computer.

6. An electronic device comprising:
   a plurality of components;
   a storage system;
   at least one processor; and
   one or more programs stored in the storage system and being executable by the at least one processor, the one or more programs comprising:
   a setting module operable to set a threshold time of the selected component to determine whether the selected component is in a normal state;

a detection module operable to detect a first interrupt instruction from the selected component, and enable a timer of the electronic device to time the threshold time; and a control module operable to determine that the selected component is in an abnormal state upon the condition that the threshold time elapsing, and restart the selected component and initialize the selected component by recording settings of the selected component before the selected component is restarted, and restoring the recorded settings of the selected component after the selected component is restarted, or determine that the selected component is in the normal state in response to the detection module detecting a second interrupt instruction before the threshold time elapses.

7. The electronic device according to claim 6, wherein the detection module is further operable to reset the timer in response to the detection module detecting the second interrupt instruction from the selected component.

8. The electronic device according to claim 6, wherein the setting module sets the threshold time by:
    determining a standard interval of the selected component, the selected component sending interrupt instructions to the at least one processor of the electronic device at each standard interval upon the condition that the selected component is in the normal state; and
    setting the threshold time of the selected component to be equal to or longer than the standard interval.

9. The electronic device according to claim 6, wherein the selected component is a camera module, and a standard interval of the camera module represents a time interval between receipts of two consecutive images of the processor when the camera module is in a preview mode.

10. The electronic device according to claim 6, wherein the electronic device is a mobile phone, a personal digital assistant, or a handheld computer.

11. A non-transitory storage medium storing a set of instructions, the set of instructions capable of being executed by a processor to perform a method for detecting operative states of components in an electronic device, the method comprising:
    determining one of the components as a selected component;
    setting a threshold time of the selected component to determine whether the selected component is in a normal state;
    in response to detecting a first interrupt instruction from the selected component, enabling a timer of the electronic device to time the threshold time;
    determining that the selected component is in the normal state in response to detecting a second interrupt instruction before the threshold time elapses; or
    determining that the selected component is in an abnormal state upon the condition that the threshold time elapsing, and restarting the selected component and initializing the selected component by recording settings of the selected component before the selected component is restarted, and restoring the recorded settings of the selected component after the selected component is restarted.

12. The non-transitory storage medium as claimed in claim 11, wherein the method further comprises:
    in response to detecting the second interrupt instruction from the selected component, resetting the timer.

13. The non-transitory storage medium as claimed in claim 11, wherein the step of setting a threshold time of the selected component to determine whether the selected component is in a normal state comprises:
    determining a standard interval of the selected component, the selected component sending interrupt instructions to the processor of the electronic device at each standard interval upon the condition that the selected component is in the normal state; and
    setting the threshold time of the selected component to be equal to or longer than the standard interval.

14. The non-transitory storage medium as claimed in claim 11, wherein the selected component is a camera module, and a standard interval of the camera module represents a time interval between receipts of two consecutive images of the processor when the camera module is in a preview mode.

15. The non-transitory storage medium as claimed in claim 11, wherein the electronic device is a mobile phone, a personal digital assistant, or a handheld computer.

* * * * *